United States Patent [19]
Hopkins

[11] 3,951,431
[45] Apr. 20, 1976

[54] SELF-STORING VEHICLE STEP ASSEMBLY
[75] Inventor: Delaney C. Hopkins, Dwight, Ill.
[73] Assignee: Caterpillar Tractor Co., Peoria, Ill.
[22] Filed: Dec. 9, 1974
[21] Appl. No.: 531,006

[52] U.S. Cl. .................................. 280/166; 182/89
[51] Int. Cl.² ........................................... B60R 3/00
[58] Field of Search ................ 280/166, 163, 164 A, 280/164; 105/443, 449; 182/89, 90

[56] References Cited
UNITED STATES PATENTS

| | | | |
|---|---|---|---|
| 374,217 | 12/1887 | Vincent et al. ................. | 280/166 X |
| 694,572 | 3/1902 | Peyton et al. ........................... | 182/89 |
| 2,677,553 | 5/1954 | Miller ............................. | 280/164 A |
| 2,979,340 | 4/1961 | Morrissey ....................... | 280/164 A |
| 3,033,309 | 5/1962 | Fugere .................................. | 182/90 |
| 3,584,704 | 6/1971 | Eckman ................................. | 182/90 |
| 3,862,670 | 1/1975 | Hovey ................................... | 182/89 |

Primary Examiner—Robert R. Song
Assistant Examiner—Michael J. Forman
Attorney, Agent, or Firm—Phillips, Moore, Weissenberger Lempio & Strabala

[57] ABSTRACT

A self-storing step assembly comprises an upright U-shaped member having a pair of parallel legs each reciprocally mounted in a tubular housing secured to a vehicle. A compression coil spring is disposed in each of the housings, between a pair of annular guide members, to engage a respective one of the legs to raise the step member to its stored position and to permit a workman to engage the step member with his foot to move it downwardly against the force of the springs to a lowered position.

10 Claims, 3 Drawing Figures

U.S. Patent  April 20, 1976  Sheet 1 of 2  3,951,431
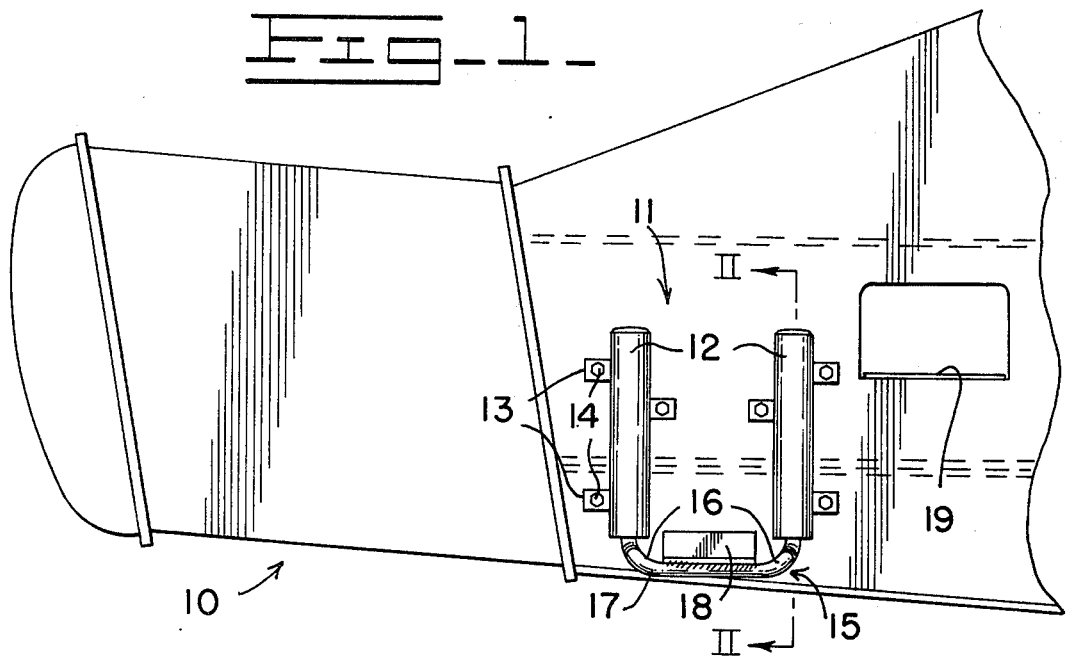
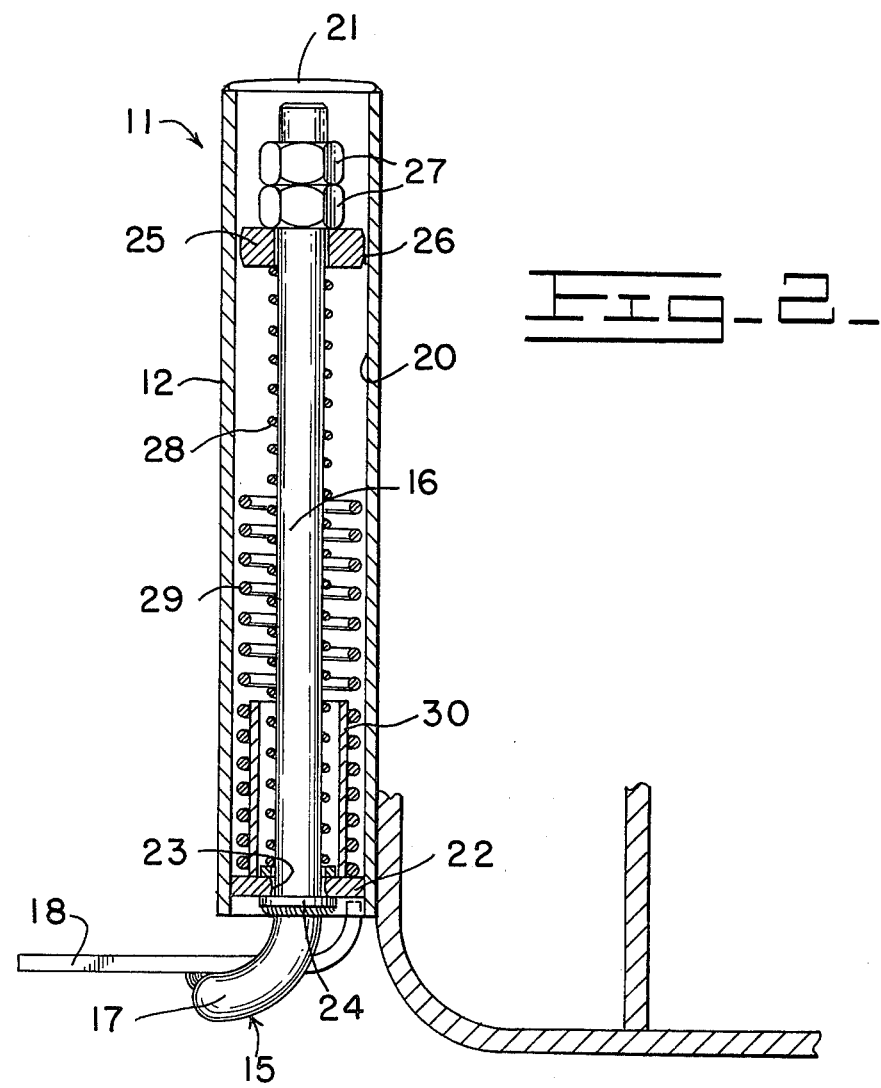

SELF-STORING VEHICLE STEP ASSEMBLY

BACKGROUND OF THE INVENTION

Large earthworking machines, such as tractor-scrapers, oftentimes utilize auxiliary engines to provide the tractive effort required for various earthworking operations. Such engines, requiring routine inspection and servicing to maintain optimum performance capabilities, are normally disposed in elevated relationship on a rearward end of such tractor-scrapers. Access to such engines is normally provided by suitably positioned ladders, handrails and/or platforms. Retractible ladders, such as the one disclosed in U.S. Pat. No. 3,826,337, are oftentimes used to facilitate such access and exhibit a self-storing capability to prevent damage to the ladder and possible injury to a workman.

SUMMARY OF THIS INVENTION

An object of this invention is to provide an improved self-storing vehicle step for a vehicle which exhibits a high degree of structural integrity and ability to be moved expeditiously and in a controlled manner between its raised, stored position and its lowered, operative position. The step assembly comprises a generally U-shaped step member comprising a pair of parallel leg portions each reciprocally mounted in a tubular housing secured on the vehicle. A first annular guide member is secured within a lower end of each housing to guide reciprocal movement of a respective one of the leg portions whereas a second annular guide member is mounted on an upper end of such leg portion to guide it within the housing. Compression coil spring means, mounted between the two guide members, normally retracts the step member upwardly to its stored position.

BRIEF DESCRIPTION OF THE DRAWINGS

Further objects of this invention will become apparent from the following description and accompanying drawings wherein:

FIG. 1 is a fragmentary side elevational view of the rearward end of a tractor-scraper having the self-storing step assembly of this invention mounted thereon and retracted to its stored position;

FIG. 2 is an enlarged sectional view taken in the direction of arrows II—II in FIG. 1.

DETAILED DESCRIPTION

Figure 3:
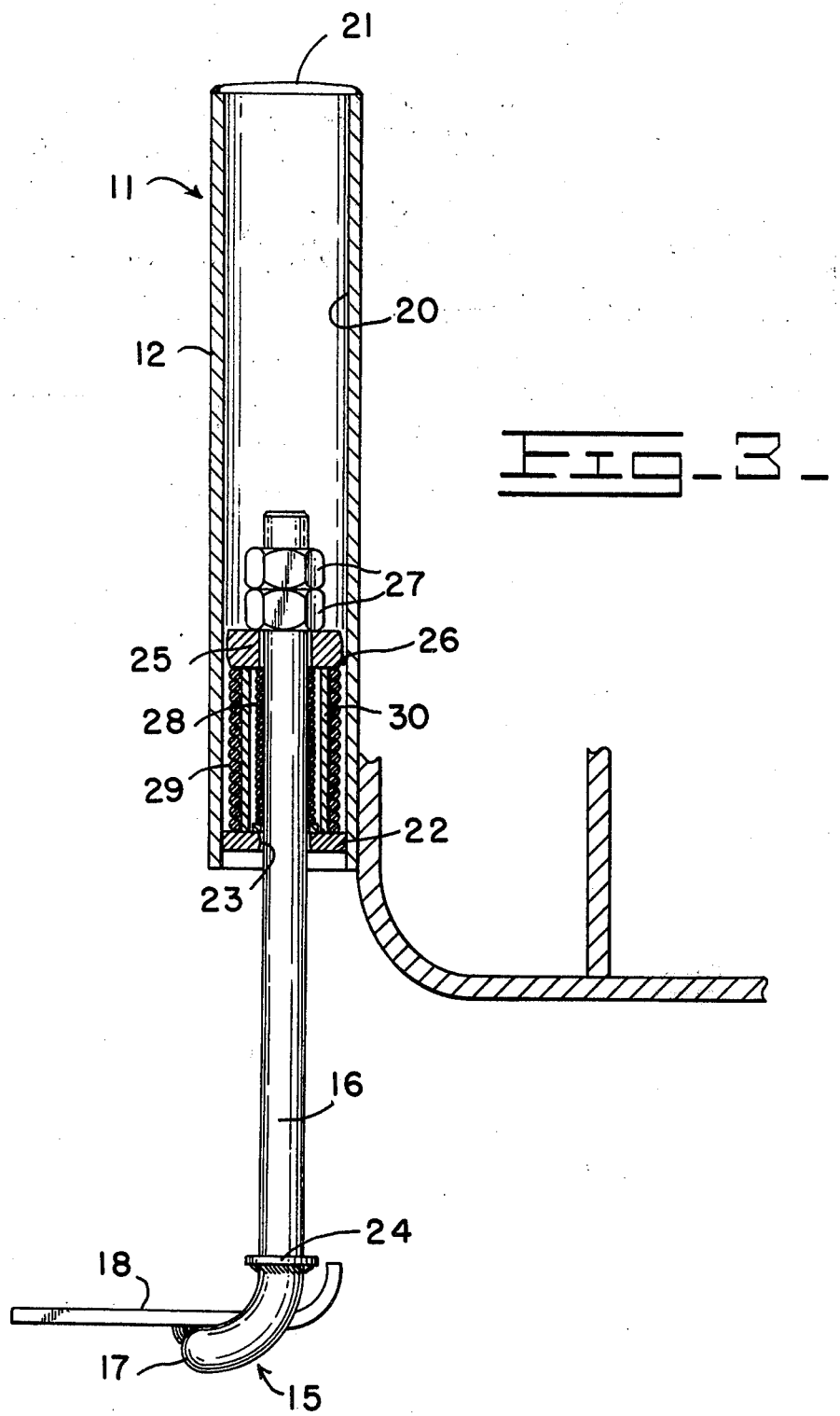
FIG. 3 is a view similar to FIG. 2, but illustrating the step assembly of this invention in its extended, operative position.

FIG. 1 illustrates a rearward end of a scraper frame 10 of a conventional tractor-scraper having a self-storing step assembly 11 of this invention mounted on a side thereof. The step assembly comprises a pair of tubular housings 12 each releasably attached on a sidewall of the scraper frame by a plurality of brackets 13 and cap screws 14. Since the housings, as well as the inner workings thereof, are identical in construction and arrangement only one thereof will be described in detail.

The step assembly further comprises an upright U-shaped step member 15 having a pair of parallel and vertically disposed leg portions 16 each reciprocally mounted in a respective housing. The lower ends of the leg portion are connected together by horizontally disposed base portion 17 having a generally flat foot pad 18 secured thereon by welds or the like. As will be hereinafter fully described, the step member is normally retracted to its FIG. 2 stored position and may be moved manually to its extended FIG. 3 operative position to permit a workman to first step on foot pad 18 and thence onto an elevated step 19 formed on a sidewall of the scraper bowl.

Referring to FIG. 2, housing 12 defines a substantially closed chamber 20 therein closed at its upper end by a cap 21 to prevent the ingress of dirt, water and the like therein. A first annular guide member 22 is secured within a lower end of the housing and has a central opening formed therethrough adapted to reciprocally receive leg portion 16 and to define an annular clearance or bleed orifice 23 therebetween. An annular washer 24 is welded or otherwise suitably secured to leg portion 16 to provide a first stop means determining the maximum, fully retracted position of the step member.

A second annular guide member 25 is loosely mounted on an upper end of leg portion 16 and closely fitted within chamber 20 to provide an annular clearance or bleed orifice 26 therebetween. A pair of lock nuts 27 are threadably mounted on the upper end of the leg portion to provide adjustment means hereinafter described. Spring means, preferably comprising a pair of compression coil springs 28 and 29, are mounted in concentric relationship on leg portion 16.

Inner spring 28 is compressed between guide members 22 and 25 to automatically retract step member 15 to its raised, stored position illustrated in FIGS. 1 and 2. Lock nuts 27 function to selectively move guide member 25 axially to impart a predetermined preload on spring 28 to hold the step member in such stored position during scraper operation. The spring rate of spring 29 is preferably greater ("stiffer") than that of spring 28 to provide a dual spring rate affording the workman with a sense of controlled support as well as to prevent an abrupt bottoming-out of guide member 25 against the upper end of a cylindrical member or second stop means 30 secured on first guide member 22 (FIG. 3).

When a workman desires to service an engine mounted on the tractor-scraper (not shown) he need only depress foot pad 18 by his foot and thence climb onto the scraper by means of step 19. The dual spring rate, provided by springs 28 and 29 as well as a controlled bleeding of air via bleed orifices 23 and 26 will provide a cushioning effect in that annular guide member 25 will further function as a piston to precisely control the escape of air from chamber 20 upon depression of step member 15. Upon release of step member 15 by the operator, springs 28 and 29 cooperate with bleed orifices 23 and 26 to provide a controlled retraction of the step member to its maximum raised position shown in FIGS. 1 and 2, upon engagement of washer 24 with the underside of member 22.

I claim:

1. A self-storing step assembly mounted on an earthworking vehicle comprising
    a pair of tubular housings secured on said vehicle,
    an upright step member comprising a pair of leg portions each reciprocally mounted in a respective one of said housings for movement between raised and lowered positions,
    a first annular guide member secured within a lower end of at least one of said housings and reciprocally receiving a respective one of said leg portions therein, a second annular guide member mounted on an upper end of at least one of said leg portions and closely fitted within said one housing, compression coil spring means disposed between said first and second annular guide members for automatically retracting said step member to its raised position and for permitting extension of said step member to its lowered position upon manual depression thereof, said spring means comprising a first compression coil spring compressed between said first and second annular guide members and a second compression coil spring, having a length less than the length of said first spring, disposed concentrically with respect to said first spring and said one leg portion.

2. The step assembly of claim 1 wherein the leg portions of said step member are disposed in parallel relationship relative to each other and are secured together at their lower ends by a horizontally disposed base portion.

3. The step assembly of claim 2 wherein a foot pad is secured on the base portion of said step member.

4. The step assembly of claim 1 wherein each of said housings is releasably attached on a sidewall of said vehicle by a plurality of brackets, secured to a respective housing, and at least one cap screw threadably mounting each of said brackets to the sidewall of said vehicle.

5. The step assembly of claim 1 further comprising an annular bleed orifice defined between said first annular guide member and said one leg portion and a second annular bleed orifice defined between said second annular guide member and said one housing whereby said bleed orifices will function to permit said step member to be lowered and raised in a controlled manner.

6. The step assembly of claim 5 further comprising a first stop means secured on said one leg portion, exteriorly of said one housing, for engaging an underside of said first annular guide member upon retraction of said step member to its raised position.

7. The step assembly of claim 6 further comprising a second stop means secured within said one housing at a lower end thereof for engagement with said second annular guide member upon extension of said step member to its lowered position.

8. The step assembly of claim 1 further comprising adjustment means threadably mounted on an upper end of said one leg portion for selectively moving said second annular guide member axially to preload said spring means.

9. The step assembly of claim 1 wherein said second compression coil means has a spring rate which is greater than said first compression coil spring.

10. A self-storing step assembly mounted on a vehicle comprising a pair of tubular housings secured on said vehicle, an upright step member comprising a pair of leg portions each reciprocally mounted in a respective one of said housings for movement between raised and lowered positions, a first annular guide member secured within a lower end of at least one of said housings and reciprocally receiving a respective one of said leg portions therein, a second annular guide member mounted on an upper end of said one leg portion and closely fitted within the said one housing, compression coil spring means disposed between said first and second annular members for automatically retracting said step member to its raised position and for permitting extension of said step member to its lowered position upon manual depression thereof, an annular bleed orifice defined between said first annular guide member and said one leg portion and a second annular bleed orifice defined between said second annular guide member and said one housing, whereby said bleed orifices will function to permit said step member to be lowered and raised in a controlled manner, and stop means secured on said one leg portion, exteriorly of said one housing for engaging an underside of said first annular guide member upon retraction of said step member to its raised position.

* * * * *